3,287,112
PRODUCTION OF FILTER MEMBRANES
Emil Blaha, Cheltenham, Pa., assignor to Selas Corporation of America, a corporation of Pennsylvania
No Drawing. Filed Nov. 26, 1963, Ser. No. 326,202
7 Claims. (Cl. 75—222)

The present invention relates to filters, and more particularly to the manufacture of a micro-porous metallic filter.

Filters with pore sizes small enough to filter out particles of micron size are available in both metals and ceramics. As far as I am aware, however, such filters are relatively thick and expensive. In addition, the cleaning of such filters after a period of use can be a time consuming operation.

It is an object of the present invention to provide a method of making thin metal filters of a pore size sufficiently small so that the filter can be used for the cold sterilization and polishing of liquids.

It is a further object of the invention to make a fine pore metal filter that can be easily cleaned for reuse, and which is characterized by a small pressure drop across the filter membrane.

The membrane can be made from metals such as silver, gold and platinum as well as base metals such as copper and iron, by following the same basic procedure.

In practicing the invention, a metal oxide is used as the base material. Such oxide is normally a fine powder, but since it has a tendency to agglomerate, before use it must be ground or broken up into the size desired for the particular filter to be made, with finer particles being used for smaller pore sizes. The particles are then mixed with a binder, such as acrylate or cellulose acetate, which will serve to hold the oxide particles together.

A solvent in which the binder can be dissolved, such as acetone or ketone, is mixed with the dry ingredients until a thin liquid is obtained. This liquid is placed on a smooth support, such as a sheet of glass, for example, by spraying, dipping or a brush. It is preferred that the support be dipped in the solution as this apparently produces a more uniform coating on the support. The solvent is then permitted to evaporate, leaving on the support a thin, even coating of metal oxide in the binder. If desired, the dipping step can be repeated to build up the thickness of the film or coating and thereby to produce a stronger and thicker filter membrane.

The support carrying the coating is then heated to a temperature and in an atmosphere in which the metal oxide decomposes, with the oxygen being driven off. During the heating the binder is also burned out. The resulting film that remains on the support is a thin, porous film of substantially pure metal. The support is then treated to loosen the film so that it can be removed intact.

Thus there is produced a thin, porous sheet of metal, the surfaces of which are as smooth as the surface of the support upon which it was formed. If the support were a flat sheet of glass the membrane produced would likewise be flat, and can be cut to any desired shape. If the support were a glass rod, the membrane would be in the form of a candle. In either case, the membrane is sufficiently thin so that, in use, it must be supported by a screen or a bed of small glass beads.

The porosity of the membrane will depend upon the size of the metal oxide particles and the type and amount of binder that is used. The finer the powder, the finer the porosity of the membrane. Since the binder has no chemical effect on metal oxide, it will have no effect on the pore size produced, and only enough is used to retain the metal oxide in place until firing. Following the above procedure, membranes can be made with pore sizes down to a fraction of a micron. Such membranes have many uses including vacuum filtering for various pharmaceutical purposes. It is believed that the pores are produced when the oxygen is driven from the oxide as a result of decomposition due to heat and are of submicron size.

In the manufacture of the porous membranes there are mixed from 2 to 10 parts by weight of powdered binder 80 to 98 parts by weight of the powdered metal oxide and up to about 50 parts by weight of solvent. The amount of solvent can vary depending upon the thickness of the membrane to be used, but ordinarily it will be a liquid about the thickness of paint, such as a dipping lacquer.

As a specific example, 95 parts of silver oxide and 5 parts acrylate are mixed and a solvent for the acrylate, such as acetone, is mixed with the dry ingredients to make a liquid of the desired thickness. A support, such as a glass plate, is dipped in the liquid to get a smooth thin film on it. After the solvent has evaporated to leave a closely adherent film of oxide and binder on the support, it is heated to slightly above 300° C., at which temperature the silver oxide decomposes, with the oxygen being driven off. This heating can take place in the air. During the heating the binder is burned out to leave a thin, porous film of substantially pure silver on the support. The support is treated with hydroflouric acid, which will attack the glass and not the silver, so that the metallic film or membrane can be removed.

The porosity of the membrane can most readily be varied by varying the material used for the binder. For example, vinyl chloride can be used in various proportions with the acrylate, or a copolymer of vinyl chloride can be used by itself as a binder. When this material is used, chlorine will be released during heating as described above, and will be combined with some of the silver to form silver chloride. After the heating has been completed, and the filter membrane is finished, it is released from the support by hydrofluoric acid. The acid not only releases the membrane from the support, but also will dissolve the silver chloride from the silver. The elimination of the silver chloride from the membrane, produces pores in sizes up to five microns, thus adding to those produced by the elimination of the oxide, as explained above.

An alternative is first to dip the support in a parting agent which is non-reactvie with the metal at the temperature encountered and will withstand the temperature. Such a material is sodium silicate. After the parting agent has dried on the support, it is dipped in the oxide solution, dried and fired as above. Since sodium silicate is soluble in water, the metal film can be removed from the support by soaking in water.

Membranes of other metals can be made by substituting other metal oxides for silver. For example, a porous copper membrane can be made by using copper oxide. In this case the support and its film must be heated to above 800° C. in an atmosphere of hydrogen in order to decompose the oxide by driving out the oxygen. Such atmosphere is necessary to prevent reoxidation of the metal.

From the above, it will be seen that I have invented a method of making a porous membrane, with microscopic pores, from a metal. Such a membrane can be made paper thin, which means that the pressure drop across it, when being used as a filter, is quite small for a given pore size. The membranes can be made in various shapes including sheets that may be cut to size for various uses. They can also be readily sterilized and cleaned for reuse.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of producing a porous membrane of a metal which comprises mixing powdered oxide of the metal with a powdered binder and a solvent for the binder to obtain a thin liquid of uniform consistency, placing a thin layer of the liquid on a support, permitting the solvent to evaporate to leave a layer of binder and metal oxide on the support, heating the support and layer of material thereon to a temperature sufficient to decompose the oxide by driving out the oxygen and burning out the binder, thereby leaving a thin layer of porous metal on the support, and removing the layer of metal from the support as a porous metal membrane.

2. The process of claim 1 in which the metal oxide is silver oxide, the binder is acrylate, and the film on the support is heated to slightly above 300° C.

3. The method of claim 2 in which the support is glass having a surface the shape the membrane is to have.

4. The method of making a thin, metallic filter membrane which comprises mixing silver oxide powder and a binder, dissolving the binder with the oxide in a solvent to form a thin solution, placing a film of the solution on a smooth support and letting the solvent evaporate, heating the support and film to a temperature slightly above 300° so that the silver oxide will dissociate and the binder be burned out, thus producing a thin, porous film of silver on the support, and removing the silver film from the support for use as a filter membrane.

5. The method of producing a porous metal membrane which comprises mixing from 80 to 98 parts by weight of a powdered metal oxide with from 2 to 10 parts by weight of a binder and up to 50 parts by weight of a solvent for the binder to form a thin liquid, only enough binder being used to hold the oxide together, placing a thin layer of the liquid on a support and permitting the solvent to evaporate to leave a coating of metal oxide and binder on the support, heating the support to a temperature and in an atmosphere to decompose the metal oxide by driving off the oxygen and burn out the binder thus leaving a thin porous metal layer on the support, and removing the layer from the support as a porous metal membrane.

6. The method of claim 5 in which the support is coated with a water soluble parting agent that is nonreactive to the metal at the temperatures encountered and will withstand the temperature prior to the time it has the liquid layer placed on it, and in which the metal layer is removed from the support by soaking the support in water to dissolve the parting agent.

7. The method of making a thin porous membrane of silver which comprises mixing from 2 to 10 parts of powdered acrylate as a binder with from 80 to 98 parts of powdered silver oxide and up to 50 parts of acetone to form a thin liquid, dipping a glass support into said liquid to coat the support therewith, permitting the solvent to evaporate thereby leaving a thin film of oxide and binder on the support, heating the support and film thereon to slightly above 300° C. to decompose the oxide and burn out the binder thereby leaving a thin layer of substantially pure porous silver on the support, and removing the silver layer from the support.

References Cited by the Examiner

UNITED STATES PATENTS

| 1,988,861 | 1/1935 | Thorausch et al. | 75—222 |
| 2,429,088 | 10/1947 | Box | 117—22 X |
| 2,550,345 | 4/1951 | Gray et al. | |
| 2,750,657 | 6/1956 | Herbert | 264—241 |
| 3,028,656 | 4/1962 | Herbert | 75—208 |
| 3,086,860 | 4/1963 | Moutaud | 75—222 |

OTHER REFERENCES

Goetzel: "Treatise on Powder Metallurgy," vol. II, Interscience Publishers, Inc., New York, N.Y., 1950, 503.

DEWAYNE RUTLEDGE, *Primary Examiner.*

REUBEN EPSTEIN, LEON D. ROSDOL, *Examiners.*

R. L. GOLDBERG, R. L. GRUDZIECKI,
*Assistant Examiners.*